UNITED STATES PATENT OFFICE.

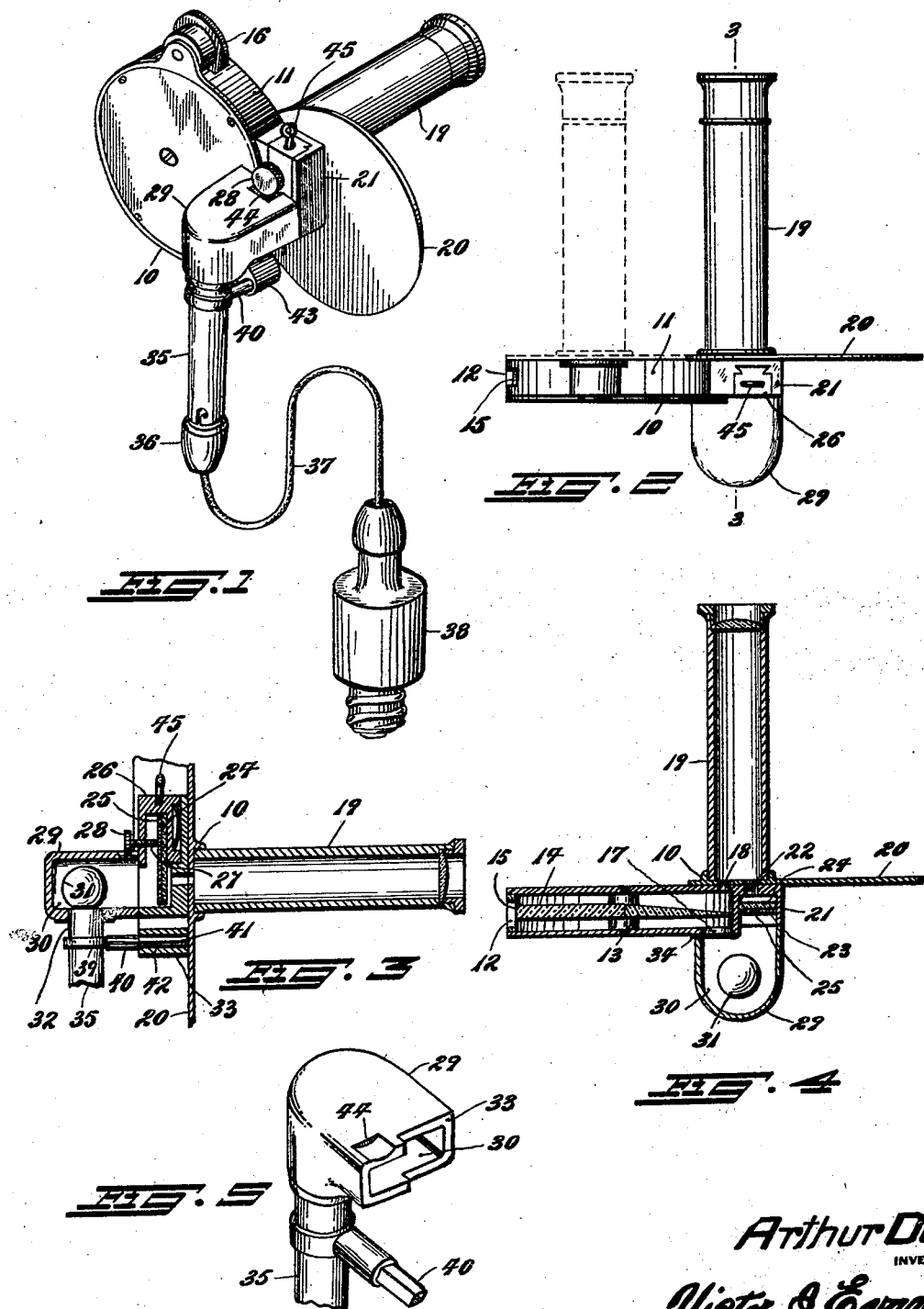

ARTHUR DARE, OF PHILADELPHIA, PENNSYLVANIA.

HEMOGLOBINOMETER AND ILLUMINATING DEVICE THEREFOR.

1,414,261.   Specification of Letters Patent.   Patented Apr. 25, 1922.

Application filed February 24, 1920. Serial No. 360,682.

*To all whom it may concern:*

Be it known that I, ARTHUR DARE, a citizen of the United States, residing at Philadelphia, in the county of Philadelphia and State of Pennsylvania, have invented new and useful Improvements in Hemoglobinometers and Illuminating Devices Therefor, of which the following is a specification.

The invention relates to hemoglobinometers for measuring or determining the amount of hemoglobin in human and animal blood and provides for the proper illumination of the specimen under observation to permit of accurately determining the color value in order that an efficient reading and accurate result can be obtained.

Among other features the invention comprehends the use of an illuminant in connection with a hemoglobinometer whereby the same intensity of light can always be had regardless of the times at which readings are taken, thus insuring accuracy in determining the amount of hemoglobin in the blood while at the same time with the use of my device, the readings and determinations can be quickly and accurately obtained, also enabling the user to perform the operation with the least amount of trouble without restricting the use of the device to a darkened room.

It is well known that in order to obtain accurate results in the use of a hemoglobinometer, the usual day-light because of its varying intensity and numerous sudden changes, is a decidedly objectionable factor and therefore, should be excluded and substituted by a light of a more constant nature. In the use of hemoglobinometers, it has been a custom in connection with certain forms of these devices to employ candle light and obtain the readings in a darkened room, but this has also been found to be unpractical, not only because of the flickering candle, but also because of the necessity of restricting the use of the device to a darkened room in order to obtain the desired result.

I aim to provide an electric light in connection with a hemoglobinometer in which the rays of light projected on to and through the specimen and the standardized color value will at all times be of the same degree and intensity and to have this light enclosed in a manner which will permit of the use of the hemoglobinometer at the bed-side of the patient or party whose blood is being tested; thus obviating the necessity of restricting the use of the device to a darkened room.

Therefore with the knowledge that daylight changes the color of blood according to its concentration and that the candle flame, although it occludes the violet rays of the solar spectrum to a great extent, is not sufficient to render the observations precise, I provide an illuminant which is substantially enclosed, or what might be termed in camera. Thus in the use of a hemoglobinometer such as is the one which for instance, known in the trade as the Dare hemoglobinometer, is substantially illustrated and described in United States Patent No. 663,536, granted to Fox & Clare, December 11, 1900, I do away with the form of candle light formerly employed with this device and by the use of an electric lamp instead of the candle, I avoid the objections incurred in the use of a candle, namely the light flicker, the excessive heat generated and the smoke produced by the combustion resulting in the candle flame. Still further by having the electric lamp enclosed in a housing and as mentioned heretofore, substantially in camera, I obtain a direct concentration of a steady light upon a specimen under observation and the color value scale so that the single light and its projective rays are common to the specimen and the color value scale, thereby insuring greater accuracy in the reading.

In the further disclosure of the invention, reference is to be had to the accompanying drawings constituting a part of this specification, in which similar characters of reference denote corresponding parts in all the views, and in which,—

Figure 1— is a perspective view of a hemoglobinometer equipped with my device.

Figure 2— is a plan view, the dotted lines indicating the normal position of the telescope and its mounting.

Figure 3— is a vertical longitudinal sectional view taken on the line 3—3 in Figure 2.

Figure 4— is a horizontal sectional view taken through the hemoglobinometer, and Figure 5— is a fragmentary perspective view of the lamp attachment by itself.

Referring more particularly to the views, it will be apparent to those skilled in the art, that the illustrations show a hemoglobinometer substantially of the kind known in the trade as the Dare hemoglobinometer and which as mentioned heretofore, is described and illustrated in United States Letters Patent No. 663,536. Therefore in describing the hemoglobinometer as illustrated herein, I will merely devote myself generally to the constructional features, laying particular stress upon my improvement and the mode of attaching the same. The hemoglobinometer is indicated in its entirety by the numeral 10 and comprises a substantially circular casing 11 provided with a side opening or slot 12 with a disk 13 revolubly carried in the casing 11, the disk having a ruby glass portion 14 and on its periphery provided with graduations 15 which can be observed through the side opening or slot 12. Rotation of the disk is brought about by the use of a knurled wheel 16 mounted on the casing and having a portion extending within the same to have frictional contact with a portion of the periphery of the disk. The disk 13 may be made of some translucent substance such as porcelain or the like and the ruby glass portions 14 formed thereon or secured thereto in any desired manner and the front of the casing is provided with a window 17 through which the disk 13 may be observed, the window 17 being in line with an aperture 18 in the rear of the casing so that a telescope 19 mounted on a disk or member 20, pivoted to the casing 11 at the rear, can be arranged to align with the window 17 and aperture 18, so that with sufficient light entering the window, the disk can be observed through the telescope and upon rotation will show different red color values through the aperture 18.

The casing 11 has an extension 21 which is in fact a chamber, open at the front and the top and provided with an aperture 22 also common to the telescope 19 when the latter is in position to permit of viewing the color chart or disk 13. The chamber formed by the extension 21 is fitted to receive a blood containing device or pipette 23. the latter consisting substantially of two plates 24, 25, one of which may be made of glass and the other of porcelain and so associated that a drop or particle of blood can be retained between the plates, these plates being secured in a suitable holder 26 which in fact is a part of the pipette with a screw 27 having a knurled head 28 threaded on to the holder to engage one of the plates and secure the plates in the holder and relatively rigid. Now when the holder is disposed in the chamber of the extension 21 and slid into position it will be apparent that the blood between the plates will be brought into alignment with the aperture 22 and thus when viewed through the telescope two apertures will be seen, one of the apertures being the aperture 18 and the other the aperture 22, with the standardized color chart viewed through the aperture 18 and the particle of blood through the aperture 22, both of which apertures are common to the telescope.

In order to illuminate and clearly show up that portion of the ruby glass of the disk which will be viewed through the aperture 18 when looking into the telescope 19 and also illuminate the blood held in the pipette and which will be seen through the aperture 22 when viewed through the telescope, I provide a housing 29 which forms a part of my illuminating element or device and which housing provides a lamp chamber 30 for the disposition of an electric lamp 31, suitably socketed as at 32, the housing being open at one end as at 33 and having this open end of a configuration to fit against a rib or border 34 around the wiidow 17, the housing at the open end also fitting closely against the extension 21 so as to enclose the ordinarily visible portions of the plates 24, 25, it being understood that when the housing is in position, day-light will be excluded and the illuminant or lamp will be substantially in camera, so that only the light from the lamp will constitute the source of illumination necessary to a proper operation of the hemoglobinometer. The housing 29 is carried on a stem or upright 35 to the lower end of which is attached in any suitable manner an electric plug 36 which together with the manner in which the lamp is socketed as at 32, will provide suitable connection with the lamp for the electric current. The plug 36 of course has electric wires 37 attached thereto and these in turn are connected to an electric plug 38 which may be in the form of a current reducer or any known or desired form, so that the plug can be attached to the usual electric lighting circuit found in buildings and thus provide sufficient current to illuminate the lamp 31. Secured in any suitable manner to the stem 35 is a clamp 39 forming a part of a holder 40 which in turn includes a squared shank 41 adapted to be received in a squared opening 42 in an ear 43 projecting from the periphery of the casing 11 and in order to facilitate the attachment of the illuminating device to the hemoglobinometer, I preferably provide the housing 29 with a grooved portion or surface 44 so that when the housing is arranged in position and the pipette 23 is disposed in the chamber of the extension 21, the knurled head 28 of the screw 27 will engage with the surface of the grooved portion 44 of the housing and thus serve to not only insure the proper disposition of the pipette in position to bring the blood in alignment with the aperture 22, but also result in a frictional contact of the pipette with the housing thereby securing the illuminating attachment or device more securely to the hemoglobinometer. With this arrangement the illuminating attachment will be supported by the holder 40 and the engagement of the knurled head of the screw 27 making in fact a substantially rigid structure with the hemoglobinometer, while at the same time this form of connection and manner of applying the illuminating device to the hemoglobinometer provides the necessary construction for insuring the proper positioning of the pipette so that the specimen of blood will be brought into proper alignment so that it can be viewed through the telescope. It will of course be apparent that the stem 35 may be conveniently employed as a handle for holding the hemoglobinometer and that the illuminating attachment when applied to the hemoglobinometer as stated, provides substantially a unitary structure.

It will now be apparent that the open end of the housing for the electric lamp is common to the two apertures 18, 22, so that when viewed through the telescope the particular part of the ruby glass portion aligning with the aperture 18 and the blood specimen aligning with the aperture 22, will both be seen at the same time through the telescope and will both be illuminated by the electric lamp in the housing and in order that a maximum illumination may be insured, the interior of the housing can be colored or polished to provide a reflecting surface so that the rays of light from the lamp will be projected toward the apertures and through the translucent ruby glass portion and the blood specimen.

I am aware that electric lamps have been used heretofore for the purpose of illuminating certain surfaces, objects, or the like, particularly in connection with measuring and computing devices, but it should be observed that in the present instance I provide a single electric lamp, carried in camera and so arranged in connection with the hemoglobinometer that the single electric lamp serves as an illuminant for both the blood specimen and the color value chart or disk, the rays from the lamp being common to those portions of the hemoglobinometer which are to be viewed through the telescope so that when the color value of the disk as seen through the telescope, matches the particular color of the blood specimen as viewed through the telescope, the graduation disclosed in the said opening 12 of the casing will determine the amount of hemoglobin in the blood specimen under observation.

As mentioned heretofore the pipette serves not only as the means for holding the blood specimen and for bringing the blood specimen into position for observation, but the knurled head 28 of the screw 27, constituting a part of the pipette also engages with the housing to facilitate the engagement of the housing in rigid position with the casing. Thus in order to entirely withdraw or partially withdraw the pipette from the chamber of the extension, the pipette at one end is provided with a handle 45 which may be in the nature of an eyelet and which can be conveniently gripped for the purpose of withdrawing the pipette from the chamber of the extension or for inserting the pipette. By having the handle in the form of eyelet, the handle also provides for conveniently hanging up a large number of the pipettes on a rod or wire in the laboratory when the pipettes are not in use.

It will be noted that in an instrument of the character described the rays of light from the illuminating member, namely the electric lamp, are transmitted directly to the blood or other specimen and the comparative portion of the color scale, it being well known that in instruments where great precision in reading color values is required, the reflection of the light on to a mirror or some other reflecting medium, not only effects the color value when later viewed because of the observation of certain of the rays of light, but also because of the irregularity of the rays of light due to a change of the focus. With this in mind it is essential that the rays of light be transmitted directly to and through the specimen and the color scale and that the viewing apparatus, namely the telescope, be in a position to observe the color values when the light is directly transmitted to the parts under observation. Further to insure accurate readings, it is necessary to exclude daylight and to provide an illuminant which will emit a steady light devoid of any flicker and it is for this reason that I have in my device arranged the illuminant in camera, shutting out all daylight and providing by means of the electric lamp, a steady light of sufficient intensity to insure the desired result.

Having described my invention, I claim,—

1. An illuminating device for a homoglobinometer including a casing having a plurality of viewing apertures and a telescope common to said apertures, of an extension on the casing and provided with a squared opening, a housing open at one end, illuminating means carried in the housing and a holder for the housing having a squared portion fitting into the squared opening in the extension to position said housing in engagement with said casing so that the open end of the housing will be common to the said viewing apertures, closing the same against the intrusion of daylight.

2. The combination with a homoglobinometer including a casing having an opening therein for the admission of light, of a hollow member open at one end, means including a pin and socket connection for securing the hollow member in position, whereby the open end of said member will surround the opening in the casing and a source of light positioned within the hollow member.

3. The combination with a hemoglobinometer including a source of electric light for illuminating a specimen of blood and a color scale, of a daylight excluding housing enclosing the source of light, a tubular handle extending from the housing, an electric contact at the outer end of the tubular handle and means removably connecting the tubular handle and hemoglobinometer for removably holding the housing in position.

In testimony whereof I affix my signature.

ARTHUR DARE.